United States Patent
Wang

(10) Patent No.: US 11,353,875 B2
(45) Date of Patent: Jun. 7, 2022

(54) TARGET INTENTION PREDICTING METHOD AND SYSTEM THEREOF

(71) Applicant: Automotive Research & Testing Center, Changhua County (TW)

(72) Inventor: Wei-Jen Wang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 331 days.

(21) Appl. No.: 16/695,134

(22) Filed: Nov. 25, 2019

(65) Prior Publication Data

US 2021/0080959 A1    Mar. 18, 2021

(30) Foreign Application Priority Data

Sep. 18, 2019 (TW) ................................ 108133660

(51) Int. Cl.
  *G05D 1/02* (2020.01)
  *G08G 1/16* (2006.01)
  *G05D 1/00* (2006.01)

(52) U.S. Cl.
  CPC ......... *G05D 1/0212* (2013.01); *G05D 1/0088* (2013.01); *G08G 1/166* (2013.01)

(58) Field of Classification Search
  CPC ..... G05D 1/0212; G05D 1/0088; G08G 1/166
  USPC .......................................................... 701/23
  See application file for complete search history.

(56) References Cited

U.S. PATENT DOCUMENTS

| | | | |
|---|---|---|---|
| 9,511,767 B1* | 12/2016 | Okumura | G08G 1/09626 |
| 2007/0043502 A1* | 2/2007 | Mudalige | B60T 7/22 701/301 |
| 2018/0154899 A1* | 6/2018 | Tiwari | B60W 60/0011 |
| 2019/0377349 A1* | 12/2019 | van der Merwe | G05D 1/0231 |
| 2020/0216084 A1* | 7/2020 | Balachandran | G05D 1/0055 |
| 2021/0380139 A1* | 12/2021 | Taveira | B60W 40/08 |

* cited by examiner

*Primary Examiner* — Yazan A Soofi
(74) *Attorney, Agent, or Firm* — CKC & Partners Co., LLC

(57) ABSTRACT

A target intention predicting method including a dataset obtaining step and a calculating and map mapping step is provided. A host vehicle positioning dataset of a host vehicle and a plurality of target datasets of a target are obtained. Each of the target datasets corresponds to each of a plurality of time points of a time line, and each of the target datasets includes a target position and a target velocity. The host vehicle positioning dataset is mapped to a map. The target position at the last one of the time points is mapped to the map. An updated velocity of the target is calculated according to the target velocities of the target datasets, and the updated velocity is mapped to the map to predicting a target future position of the target on the map at a future time point according to the updated velocity.

10 Claims, 4 Drawing Sheets

TARGET INTENTION PREDICTING METHOD AND SYSTEM THEREOF

RELATED APPLICATIONS

This application claims priority to Taiwan Application Serial Number 108133660, filed Sep. 18, 2019, which is herein incorporated by reference.

BACKGROUND

Technical Field

The present disclosure relates to a predicting method and a system thereof. More particularly, the present disclosure relates to a target intention predicting method and a system thereof for a vehicle during driving.

Description of Related Art

Owing to the improvement of the technique, vehicles, especially automated vehicles, employing automatic vehicle intelligent driver assistance system or autopilot system are developed. In view of the dynamic motion of the vehicles, collisions between vehicles and obstacles, such as a pedestrian or another vehicle on the same route, have to be avoided. Hence, a target position or a track predicting method for the obstacles is developed to increase the driving safety.

However, the environment of a city is complex, and the traffic flow in the city is mixed with cars and motorcycles. Moreover, there are a great number of obstacles having changeable tracks in an intersection with multi-directional signs; as a result, it is difficult in obstacle predicting and analysis. In addition, in a conventional way to analyze the obstacles, the motion of the obstacle at a future time point is predicted according to the motion of the obstacle at a single pass time point. Without considering the continuity of the time, such analysis will lead to a wrong prediction.

Based on the abovementioned problems, how to increase the analysis accuracy of the obstacles, or the targets, becomes a pursuit target for the practitioners.

SUMMARY

According to one aspect of the present disclosure, a target intention predicting method including a dataset obtaining step and a calculating and map mapping step is provided. In the dataset obtaining step, a host vehicle positioning dataset of a host vehicle and a plurality of target datasets of at least one target are obtained. Each of the target datasets corresponds to each of a plurality of time points of a time line, and each of the target datasets includes a target position and a target velocity. In the calculating and map mapping step, the host vehicle positioning dataset is mapped to a map. The target position at the last one of the time point is mapped to the map. An updated velocity of the at least one target is calculated according to the target velocities of the target datasets, and the updated velocity is mapped to the map to predict a target future position of the at least one target on the map at a future time point according to the updated velocity.

According to another aspect of the present disclosure, a target intention predicting system which is applied to the target intention predicting method is provided. The target intention predicting system includes the host vehicle, at least one sensor disposed at the host vehicle to detect the at least one target, and a processor signally connected to the at least one sensor to obtain the target datasets of the at least one target.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as be "disposed on", "connected to" or "coupled to" another element, it can be directly disposed on, connected or coupled to the other element, or it can be indirectly disposed on, connected or coupled to the other element, that is, intervening elements may be present. In contrast, when an element is referred to as be "directly disposed on", "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1:
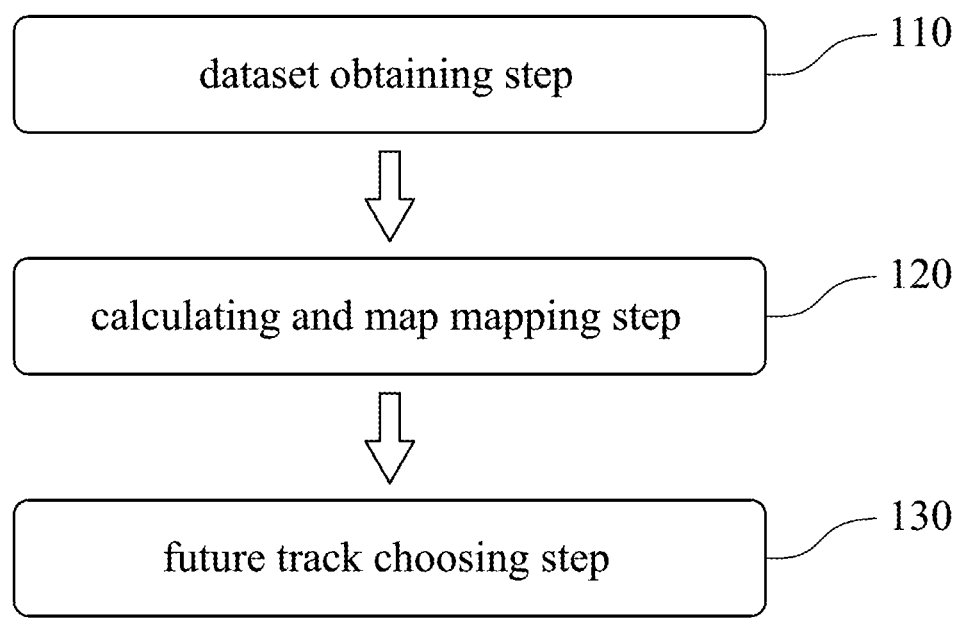
FIG. 1 is a block diagram of a target intention predicting method according to an embodiment of the present disclosure.

FIG. 1 is a block diagram of a target intention predicting method 100 according to an embodiment of the present disclosure. The target intention predicting method 100 includes a dataset obtaining step 110 and a calculating and map mapping step 120.

In the dataset obtaining step 100, a host vehicle positioning dataset of a host vehicle and a plurality of target datasets of at least one target are obtained. The target datasets correspond to a plurality of time points of a time line, and each of the target datasets includes a target position and a target velocity.

In the calculating and map mapping step 120, the host vehicle positioning dataset is mapped to a map. The target position at the last one of the time points is mapped to the map. An updated velocity of the at least one target is calculated according to the target velocities of the target datasets, and the updated velocity is mapped to the map to predict a target future position of the at least one target on the map at a future time point according to the updated velocity.

Therefore, through mapping the host vehicle and the target to the map, the position of the target on the map can be known, which facilitates adjustment of the target intention. In addition, through calculating target velocities at different time points, the time continuity is considered, and the accuracy for predicting the target is increased. The details of the target intention predicting method 100 will be described in the following paragraphs.

The host vehicle travels on a road, and the host vehicle positioning dataset can be obtained by a real time kinematic (RTK) method. Consequently, the host vehicle positioning dataset can include a longitude, a latitude and a course angle.

The target dataset can be obtained by at least one sensor (not shown in FIGS. 1 and 2) disposed at the host vehicle. In other embodiments, the target dataset can be, but not limited to, obtained by an environment signal from a vehicle to everything (V2X) system.

Therefore, in the dataset obtaining step 110, when the host vehicle is traveling, the sensor will detect the targets continuously to obtain each target dataset of the target corresponding to each time point, and then the target datasets will be stored in a processor (not shown in FIG. 1) of the host vehicle as a matrix. Please be noted that each target position of each target dataset obtained from the sensor represents the position relative to the host vehicle, and the target velocity represents the velocity relative to the host vehicle.

In the calculating and map mapping step 120, the main purpose is to match all of the datasets to the map. The map has much information, and preferably, the map has high resolution information, such as the lane lines, the number of the lanes, the sidewalks and the buildings. Hence, when all of the datasets are matched to the map, the position of the host vehicle and the target on the map can be known; as a result, the accuracy of the intention prediction can be increased. For example, if a target is located at a sidewalk, the intention thereof may be walking along the sidewalk. Similarly, if a target is located at an intersection, the intention thereof may be passing through the intersection. Additionally, the target can be classified to be a pedestrian or a pedestrian-like as long as the target is located on the sidewalk; accordingly, it can be known that the velocity changeability thereof is low, but the direction changeability thereof is high. Hence, through the assistance of the map, the intention can be efficiently predicted.

In one embodiment, the map can be stored in the processor of the host vehicle in advance, or the map can be, but not limited to, obtained in real time from the V2X system. Additionally, the host vehicle positioning dataset obtained from the RTK method can include the longitude, the latitude and the course angle, and the map can be rotated according to the course angle while the map is shifted according to the longitude and the latitude, thereby allowing the host position to match to the map.

Since the target positions of the target datasets represent the distance relative to the host vehicle, translation of the coordinate is required. By applying translation equation (1), the target position can be mapped to the map, and the origin of the map is defined as the position of the host vehicle on the map.

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}. \quad (1)$$

x and y represent the original target position, and x' and y' represent the position of the target on the map corresponding to X axis and Y axis, respectively, after translation. 8 represents the course angle with the positive X axis of the map.

In the calculating and map mapping step 120, the target position at the last one of the time points may be mapped to the map first before calculating the updated velocity of the target, or the updated velocity may be calculated first, and then the target position and the updated velocity may be mapped to the map at the same time. The present disclosure is not limited thereto.

Moreover, as shown in equation (2), the updated velocity can be calculated by a weighted moving average (WMA) method.

$$(Vwma_x, Vwma_y) = \left( \frac{\Sigma_{i=0}^{n} V_{xi} \times i}{\Sigma_{i=0}^{n} i}, \frac{\Sigma_{i=0}^{n} V_{yi} \times i}{\Sigma_{i=0}^{n} i} \right). \quad (2)$$

$Vwma_x$ represents a component of the updated velocity along X axis. $Vwma_y$ represents a component of the updated velocity along Y axis. i is a positive integer. n represents a number of the time points. $V_{xi}$ represents a component of each target velocity at each time point along X axis. $V_{yi}$ represents a component of each target velocity at each time point along Y axis. For example, the target velocities from the 1st time point to the 10th time point can be substituted into equation (2), and n is set to 10. After the target velocity at the 11th time point is obtained, the target velocity at the 2nd time point will become the new 1st target velocity and the target velocity at the 11th time point will become the new 10th target velocity while the target velocity at the first time point is deleted, thereby remaining n=10. In other words, the oldest target velocity will be deleted, and the newest target velocity will be added to remain n=10.

After the updated velocity is obtained, the updated velocity can be substituted into equation (3) such that the updated velocity can be mapped to the map.

$$\begin{bmatrix} Vwma'_x \\ Vwma'_y \end{bmatrix} = \begin{bmatrix} \cos\theta & -\sin\theta \\ \sin\theta & \cos\theta \end{bmatrix} \begin{bmatrix} Vwma_x \\ Vwma_y \end{bmatrix}. \quad (3)$$

$Vwma_x'$ represents a component of the updated velocity along X axis after translated. $Vwma_y'$ represents a component of the updated velocity along Y axis after translated.

Therefore, as long as the translated updated velocity is multiplied by the future time point, e.g., 1 second, the target future position on the map at next 1 second can be obtained.

In the calculating and map mapping step 120, the updated velocity is calculated according to the target velocities within a time threshold. The time threshold is defined to be the target velocity at the last one of the time points multiplied by an estimating value, and the estimating value is within 0 to 1. Consequently, the time threshold may be adjusted by the target velocity at the last one of the time points, i.e., the present velocity, to allow the updated velocity to match the real situation, thereby improving the accuracy of the target intention predicting method 100.

In one embodiment, in the calculating and map mapping step 120, the at least one target may be classified into a vehicle type, a pedestrian-like type or a pedestrian type, and the estimating value of the vehicle type, the estimating value of the pedestrian-like type and the estimating value of the pedestrian type are different. If the target is classified into the vehicle type, the estimating value is set to $\frac{1}{5}$ second. If the target is classified into the pedestrian-like type, the estimating value is set to $\frac{1}{8}$ second. If the target is classified into the pedestrian type, the estimating value is set to $\frac{1}{10}$ second.

When processing the target classification, the target can be classified according to the position of the target on the map, a length of the target, a width of the target, or a ratio of the length to the width. In one embodiment, the target is classified into the pedestrian type as long as the target is located on the sidewalk; on the contrary, if the target is not located on the sidewalk, whether the length and the width are greater than 4 m and 1.5 m, respectively, is further judged. If yes, the target is classified into the vehicle type. If not, whether the ratio of the length to the width is equal to or greater than 2 is judged, and the target is classified into the pedestrian-like type such as a motorcycle or a bike as long as the ratio is equal to or greater than 2 while the target is classified into the pedestrian type as long as the ratio is smaller than 2. The length and the width can be detected by an optical radar of the host vehicle first, and then be translated by equations (4) and (5) to match to the map for classification of the target.

$$H_r = W_o \times \cos\theta^2 + H_o \times \sin\theta^2 \quad (4).$$

$$W_r = W_o \times \sin\theta^2 + H_o \times \cos\theta^2 \quad (5).$$

$H_r$ represents the translated length. $W_r$ represents the translated width. $H_o$ represents the original length. $W_o$ represents the original width.

After classifying the target, estimating value of different types can be set according to the agilities of different types, the degrees of freedom of different types, or whether the route is easily changeable. Hence, if the target is classified into the vehicle type and the target velocity at the last one of the time points is equal to 40 km/h (11.1 m/s) and the estimating value is set to ⅕ second, the time threshold can be set to 2.2 seconds. Subsequently, the target velocities detected within 2.2 seconds before the last one of the time points will be substituted into equation (2). If the target is classified into the pedestrian-like type and the target velocity at the last one of the time points is equal to 40 km/h (11.1 m/s) and the estimating value is set to ⅛ second, the time threshold can be set to 1.3 seconds. Subsequently, the target velocities detected within 1.3 seconds before the last one of the time points will be substituted into equation (2). If the target is classified into the pedestrian-like type and the target velocity at the last one of the time points is equal to 16 km/h (4.4 m/s) and the estimating value is set to 1/10 second, the time threshold can be set to 0.44 second. Subsequently, the target velocities detected within 0.44 second before the last one of the time points will be substituted into equation (2). The present disclosure is not limited thereto.

Additionally, the future time point can be set to a value equal to the time threshold. Precisely, if the target is classified into the vehicle type, the future time point can be set to 2.2 seconds. Consequently, the X-coordinate of the target future position is equal to x'+(Vwma$_x$')×2.2, and the Y-coordinate of the target future position is equal to y'+(Vwma$_y$')×2.2. Similarly, if the target is classified into the pedestrian-like type, the target future time point can be set to 1.3 seconds. Consequently, the X-coordinate of the target future position is equal to x'+(Vwma$_x$')×1.3, and the Y-coordinate of the target future position is equal to y'+(Vwma$_y$')×1.3. If the target is classified into the pedestrian type, the target future time point can be set to 0.44 second. Consequently, the X-coordinate of the target future position is equal to x'+(Vwma$_x$')×0.44, and the Y-coordinate of the target future position is equal to y'+(Vwma$_y$')×0.44.

In the embodiment of FIG. 1, the target intention predicting method 100 can further include a future track choosing step 130. The host vehicle includes a plurality of future tracks on the map, and one of the future tracks is chosen according to the target future position of the target such that the host vehicle can evade the target.

Through obtaining the maximum value of the velocity, the minimum value of the velocity, the course angle or the route radius of the host vehicle, a plurality of future tracks that the host vehicle may travel can be obtained. In other words, each of the future tracks includes host vehicle future positions corresponding to a plurality of future time points of the time line. Since the target future positions at the future time points can be predicted, a suitable future track can be chosen such that the host vehicle future position and the target future position corresponding to the same future time point are different and the host vehicle can evade the target.

Moreover, in calculating and map mapping step 120, a region of interest (ROI) can be adjusted according to the future tracks, and the updated velocity of the target is calculated as long as the target is within the region of interest. In a situation that a number of the targets is too large, the processing efficiency of the processor will be lowered if each target is analyzed or calculated. Hence, a region of interest can be set within a specific range near the host vehicle. The host vehicle may be in a collision with the targets in the region of interest while the host vehicle may not be in a collision with the targets out of the region of interest. Therefore, the processing efficiency can be increased by only analyzing the target located within the region of interest.

The region of interest may include the future tracks that the host vehicle may travel. In a case, a host vehicle future position of the future track corresponding to the last one of the future time points is found. A first setting distance, e.g. 3 m, can be set between a front edge of the region of interest and the host vehicle future position. A second stetting distance, e.g. 3 m, can be set between a rear edge of the region of interest and the host vehicle future position. A distance equal to a lane width can be set between a left edge of the region of interest and the host vehicle future position, and another distance equal to the lane width can be, but not limited to, set between a left edge of the region of interest and the host vehicle future position. By this way, the region of interest can be adjusted through the motion of the host vehicle and the future tracks, and the flexibility is increased.

Figure 2:
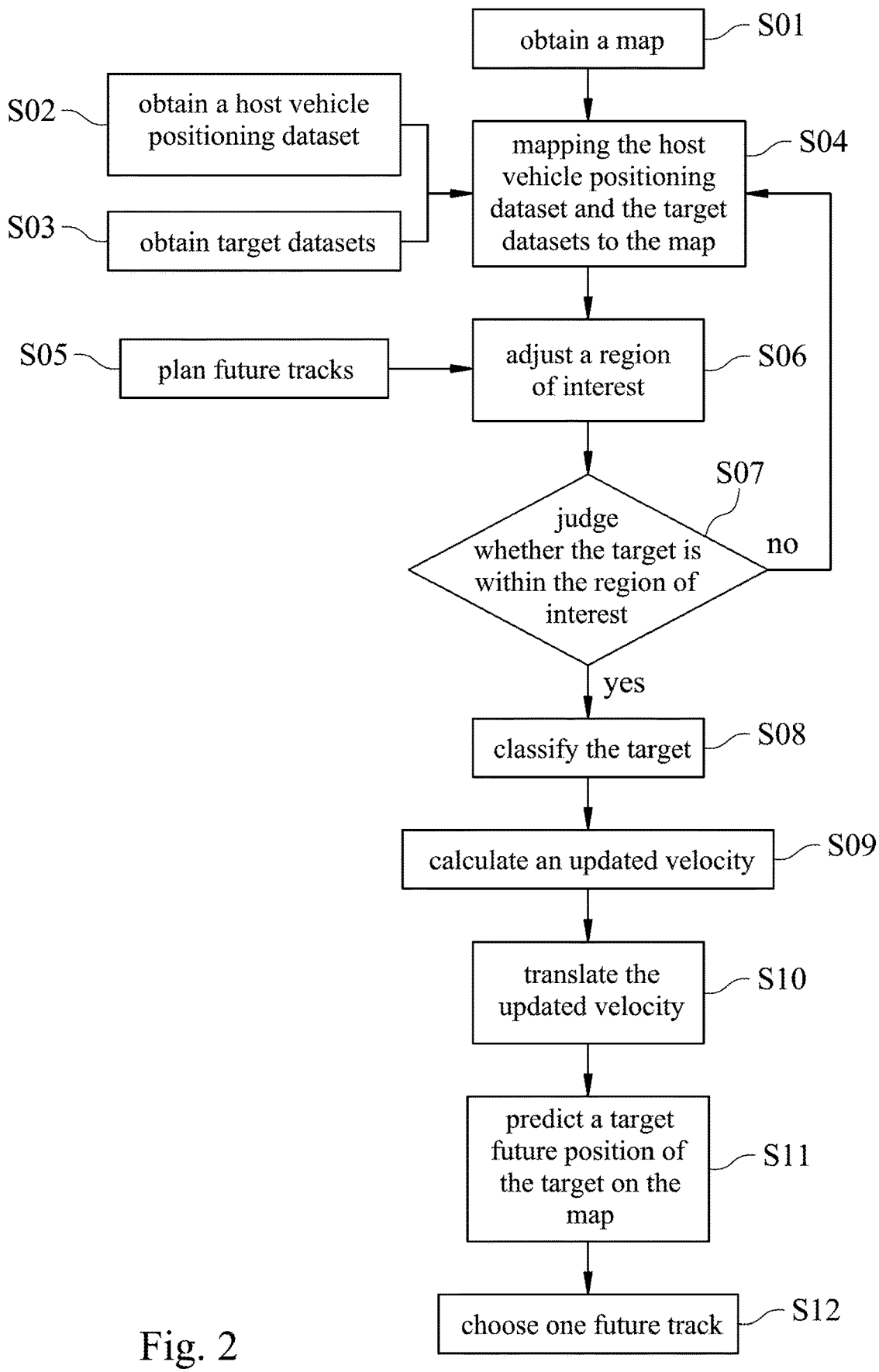
FIG. 2 is a flow chart of the target intention predicting method of FIG. 1.
Figure 3:
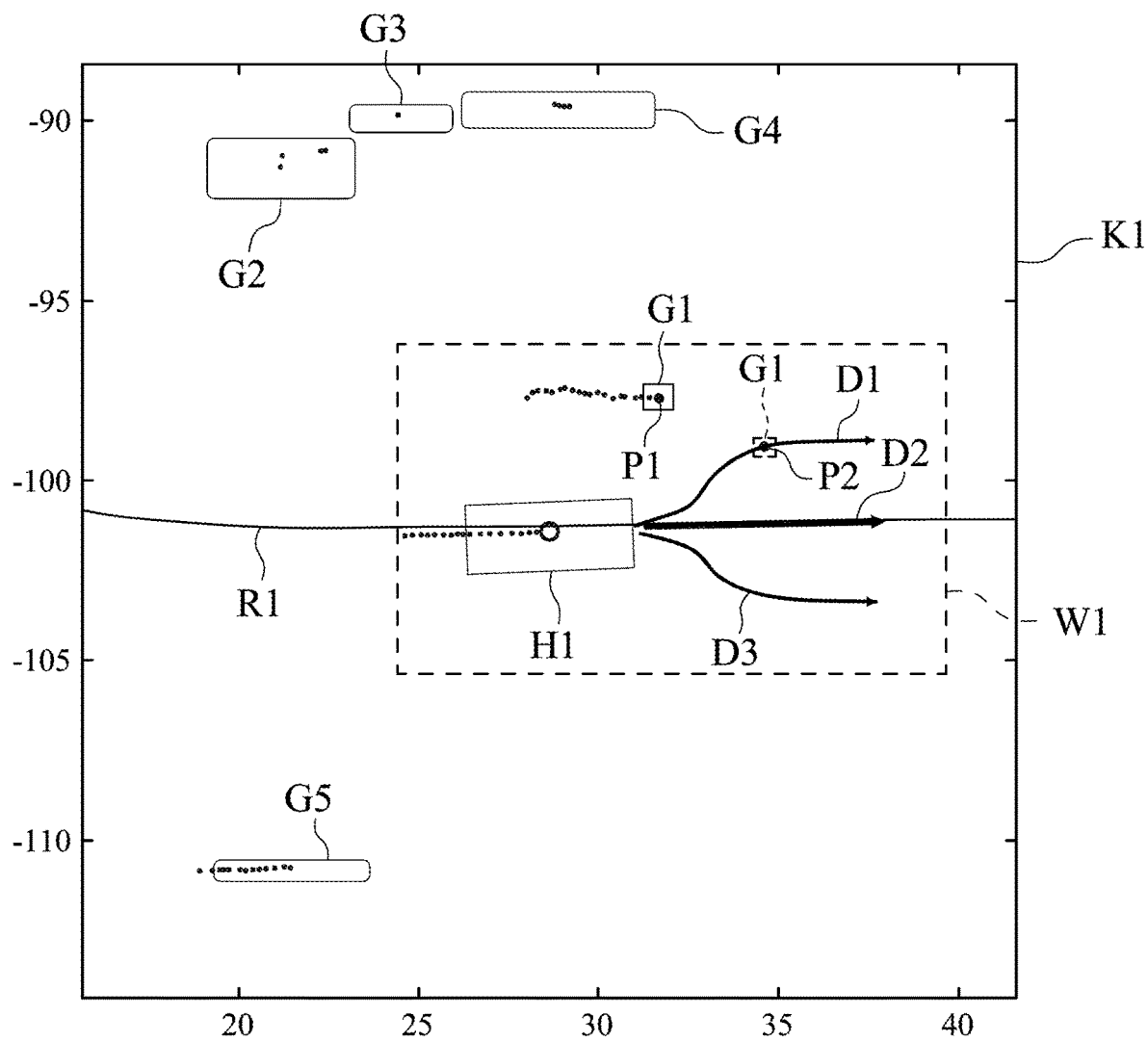
FIG. 3 is a schematic view showing the target intention predicting method of FIG. 1 corresponding to a map.

FIG. 2 is a flow chart of the target intention predicting method 100 of FIG. 1. FIG. 3 is a schematic view showing the target intention predicting method 100 of FIG. 1 corresponding to a map. Please refer to FIGS. 1 and 3, the host vehicle H1 travels on a road R1. Step S02 is executed to obtain the host vehicle positioning dataset owing to that the real time kinematic method is applied to keep monitoring the host vehicle H1. Meanwhile, Step S03 is executed to detect targets G1, G2, G3, G4 and G5. Coordinating with Step S01 to obtain map K1 in real time, Step S04 can be executed to map the host vehicle positioning dataset and the target positions of the targets G1, G2, G3, G4 and G5 to the map K1. Please be noted that only target position P1 of the target G1 is illustrated in FIG. 3.

The target datasets detected in Step S03 can be stored and processed for further application. In one embodiment, the targets G1, G2, G3, G4 and G5 are numbered by the distance. In other words, the target G1 is the nearest target and the target G5 is the farther target. If the same target, e.g., the target G1, is detected within a plurality of continuous time points, an accumulation number of target G1 will be accumulated. On the contrary, if the target, e.g., the target G2, is not detected, the accumulation number of target G2 will become zero and will be accumulated again, as shown in Table 1.

TABLE 1

|  | accumulation number of target G1 | accumulation number of target G2 | accumulation number of target G3 | accumulation number of target G4 | accumulation number of target G5 |
| --- | --- | --- | --- | --- | --- |
| 1st time point | 1 | 1 | 1 | 1 | — |
| 2nd time point | 2 | 2 | 2 | — | — |
| 3rd time point | 3 | — | 3 | 1 | — |
| 4th time point | 4 | 1 | — | — | 1 |

To be more specific, as shown in Table 1, the targets G1, G2, G3 and G4 are detected at the 1st time point, and the target datasets of the targets G1, G2, G3 and G4 are stored in the processor. Each accumulation number of each of the targets G1, G2, G3 and G4 is set to 1. The targets G1, G2 and G3 are detected at the 2nd time point, and the target datasets of the targets G1, G2 and G3 are stored in the processor while all of the target datasets of the target G4 before the 2nd time point are deleted owing to that the target G4 is not detected at the 2nd time point. The targets G1, G3 and G4 are detected at the 3rd time point, and the target datasets of the targets G1, G3 and G4 are stored in the processor while all of the target datasets of the target G2 before the 3rd time point are deleted owing to that the target G2 is not detected at the 2nd time point. Moreover, the accumulation number of the target G4 at the 3rd time point is set to 1 since the target G4 is not detected at the 2nd time point and the accumulation number of the target G4 is reset. Please be noted that the target G4 detected at the 3rd time point may not be the same target with the target G4 detected at the 2nd time point, and the same number is given in view of the distance. Furthermore, the targets G1, G2 and G5 are detected at the 4th time point, and the target datasets of the targets G1, G2 and G5 are stored in the processor while all of the target datasets of the targets G3 and G4 before the 4th time point are deleted owing to that the targets G3 and G4 are not detected at the 4th time point. The accumulation number of the target G2 at the 4th time point is set to 1 since the target G2 is not detected at the 3rd time point and the accumulation number of the target G4 is reset. Please be noted that the data processing can be done before Step S09, and it has no necessary to be completed in Step S03.

Step S05 can be executed in advance to plan a plurality of future tracks D1, D2, D3. Based on the maximum value of the velocity, the minimum value of the velocity, the course angle or the route radius of the host vehicle H1, the future tracks D1, D2, D3 that the host vehicle H1 may travel can be obtained. Hence, after completing Step S04 and obtaining the data of Step S05, Step S06 can be executed such that the region of interest W1 can be adjusted according to the future tracks D1, D2 and D3.

After Step S06, Step S07 can be executed to confirm whether the targets G1, G2, G3, G4 and G5 are located within the region of interest W1. As shown in FIG. 3, it is confirmed that only the target G1 is located within the region of interest W1. Subsequently, Step S08 can be executed to classify the target G1.

Through the classification method mentioned above, the target can be classified into, for example, a pedestrian type. Accordingly, the time threshold can be set to 0.44 second.

Hence, assuming that the target G1 is detected by the host vehicle H1 once per 0.02 second, it means that the target G1 is continuously detected within 0.44 second if the accumulation value achieves to 22. All of the target velocities corresponding to the 22 times detections will be substituted into equation (2), and n is set to 22. Step S09 is executed to obtain the updated velocity.

Subsequently, Step S10 is executed to translate the updated velocity by equation (3). Step S11 is then executed, and the target future position P2 at the future time point, i.e., 0.44 second, can be predicted according to the translated updated velocity on the map K1 and the target position P1 at the last one of the time points.

Therefore, as shown in FIGS. 2 and 3, Step S12 can be executed to choose one of the future tracks D1, D2 and D3 based on the future time point and the target future position P2. Please be noted that, both of the future tracks D2 and D3 can be chosen because there is no intersection between the target G1 and the future tracks D2 and D3, but the future track D2 is the preferable choice owing to that the direction and the velocity of the host vehicle H1 are remained if the host vehicle H1 follows the future track D2.

Figure 4:
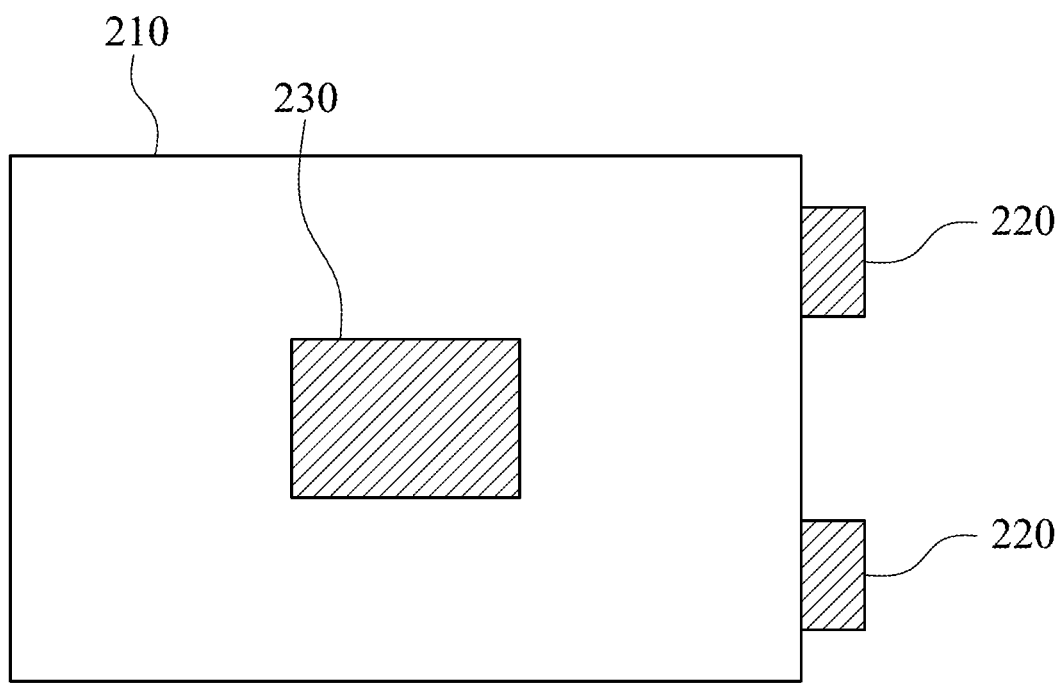
FIG. 4 is a block diagram of a target intention predicting system according to another embodiment of the present disclosure.

FIG. 4 is a block diagram of a target intention predicting system 200 according to another embodiment of the present disclosure. The target intention predicting system 200 which is applied to the target intention predicting method 100 of FIG. 1 includes a host vehicle 210, at least one sensor 220 disposed at the host vehicle 210 to detect the at least one target, and a processor 230 signally connected to the at least one sensor 220 to obtain the target datasets of the at least one target.

In the embodiment of FIG. 4, a number of the at least one sensor 220 is two. Preferably, the sensor 220 can have an optical sensor structure, such as an optical radar. The present disclosure is not limited thereto.

Based on the abovementioned embodiments, the present disclosure has advantages listed as follows.

1. Through mapping the host vehicle and the target to the map, future motion of the dynamic or static target near the host vehicle can be efficiently predicted, and the target motion prediction in a complex environment such as a city can be solved.

2. Through choosing the future track, preferable future track can be chosen such that the host vehicle can evade the target.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:
1. A target intention predicting method, comprising:
a dataset obtaining step to obtain a host vehicle positioning dataset of a host vehicle and a plurality of target datasets of at least one target, wherein each of the target datasets corresponds to each of a plurality of time points of a time line, and each of the target datasets comprises a target position and a target velocity; and a calculating and map mapping step, comprising:
mapping the host vehicle positioning dataset to a map;
mapping the target position at the last one of the time points to the map; and
calculating an updated velocity of the at least one target according to the target velocities of the target datasets, and mapping the updated velocity to the map to predict a target future position of the at least one target on the map at a future time point according to the updated velocity;
wherein the updated velocity is calculated according to the target velocities within a time threshold, the time threshold is defined to be the target velocity at the last one of the time points multiplied by an estimating value, the estimating value is within 0 to 1, the at least one target is classified into a vehicle type, a pedestrian-like type or a pedestrian type, and the estimating value of the vehicle type, the estimating value of the pedestrian-like type and the estimating value of the pedestrian type are different.

2. The target intention predicting method of claim 1, further comprising:
a future track choosing step, wherein the host vehicle comprises a plurality of future tracks on the map, and one of the future tracks is chosen according to the target future position of the at least one target such that the host vehicle evades the at least one target.

3. The target intention predicting method of claim 2, wherein, in the calculating and map mapping step, a region of interest is adjusted according to the future tracks, and the updated velocity of the at least one target is calculated as long as the at least one target is within the region of interest.

4. The target intention predicting method of claim 3, wherein a host vehicle future position of the future track corresponding to the last one of the future time points is found, a first setting distance is set between a front edge of the region of interest and the host vehicle future position, a second stetting distance is set between a rear edge of the region of interest and the host vehicle future position, a distance equal to a lane width is set between a left edge of the region of interest and the host vehicle future position, and another distance equal to the lane width is set between a left edge of the region of interest and the host vehicle future position.

5. The target intention predicting method of claim 1, wherein the at least one target is classified according to a position of the at least one target on the map, a length of the at least one target, a width of the at least one target, or a ratio of the length to the width.

6. The target intention predicting method of claim 5, wherein the future time point is set to a value equal to the time threshold.

7. The target intention predicting method of claim 1, wherein, in the calculating and map mapping step, the updated velocity is calculated by a weighted moving average method.

8. The target intention predicting method of claim 1, wherein, in the calculating and map mapping step, the host vehicle positioning dataset is obtained by a real time kinematic method.

9. A target intention predicting system, which is applied to the target intention predicting method of claim 1, comprising:
the host vehicle;
at least one sensor disposed at the host vehicle to detect the at least one target; and
a processor signally connected to the at least one sensor to obtain the target datasets of the at least one target.

10. The target intention predicting system of claim 9, wherein the least one sensor has an optical sensor structure.

* * * * *